July 21, 1959

C. L. NEWTON ET AL 2,895,724

GAS-LIQUID CONTACT APPARATUS

Filed March 21, 1956

INVENTOR.
CHARLES L. NEWTON
BY LESLIE E. WHITE

Schmieding and Fultz
ATTORNEYS

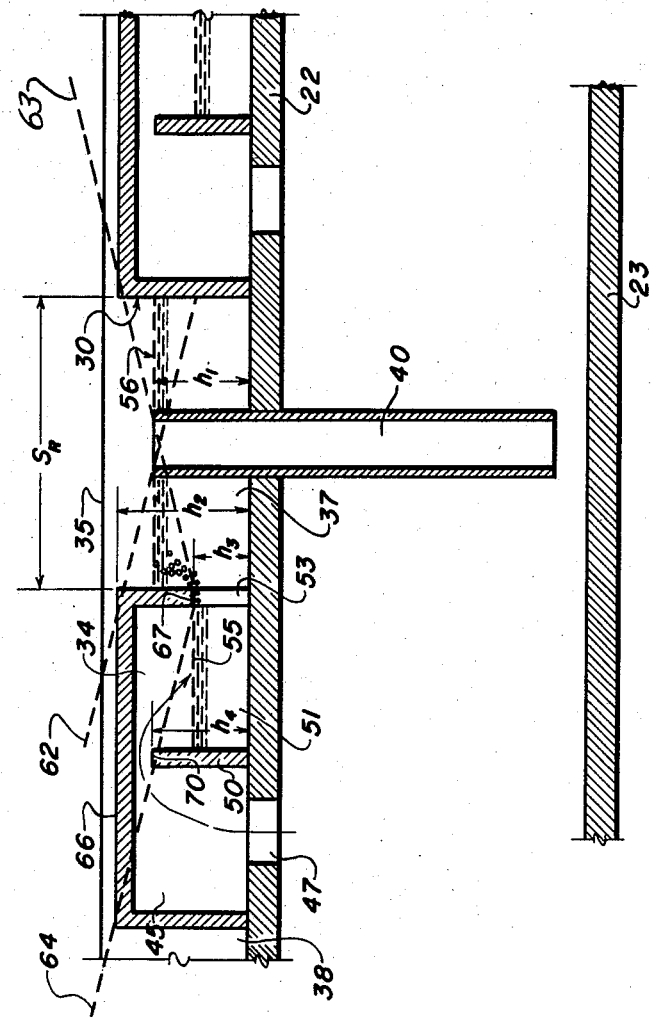

United States Patent Office 2,895,724
Patented July 21, 1959

2,895,724

GAS-LIQUID CONTACT APPARATUS

Charles Leo Newton, Columbus, Ohio, and Leslie Eugene White, Glendora, Calif., assignors to Herrick L. Johnston, Inc., Columbus, Ohio, a corporation of Ohio Application March 21, 1956, Serial No. 572,920

2 Claims. (Cl. 261—114)

This invention relates to gas separating apparatus and specifically to the type of gas-liquid contact column in which trays with bubble caps are arranged one above the other to provide superimposed pools of descending liquid through which the rising gas bubbles.

It is an object of the present invention to provide such a gas separating column adapted for continuously efficient operation when the column is pitched and rolled, relative to a normal level disposition, as would occur during shipboard operation.

It is another object of the present invention to provide a gas separating column for such type of operation adapted to function over a large range of variations in flow rate.

Further objects and advantages of the present invention will be apparent from the following description, reference being had to the accompanying drawings wherein a preferred form of embodiment of the invention is clearly shown.

In the drawing:

Figure 3 is a partial sectional view of the column of Figure 1 with the section being taken along the line 3—3 of Figure 1.

Figure 1:
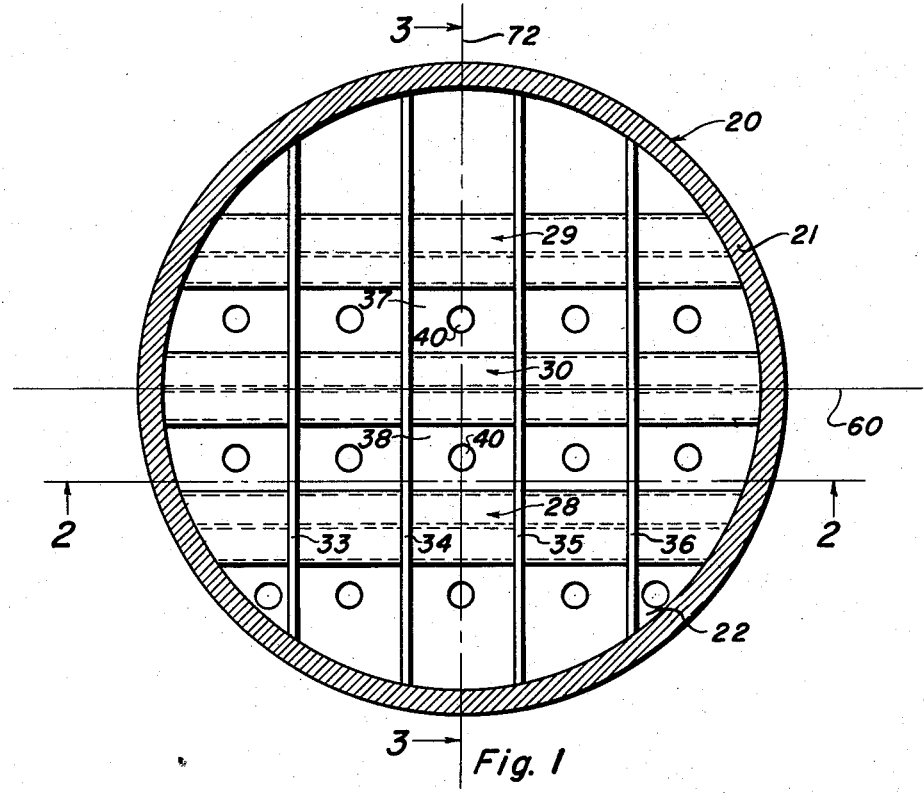
Figure 1 is a sectional view taken along a horizontal plane through a separating column constructed according to the present invention.
Figure 2:
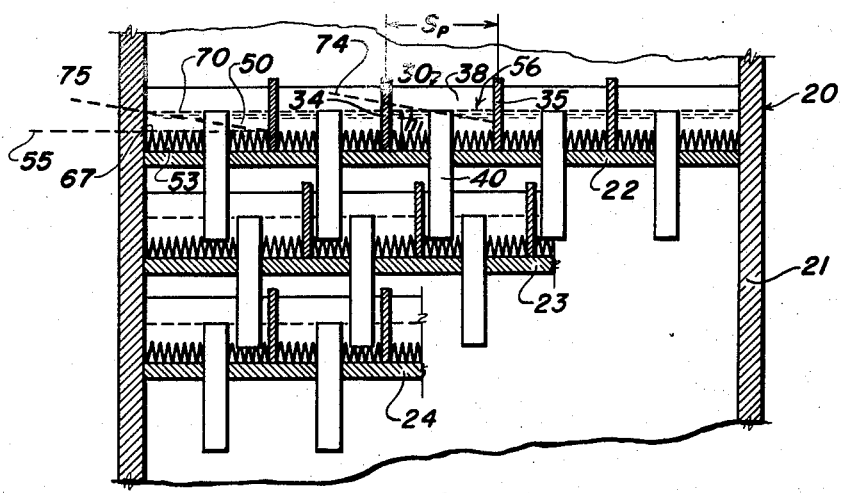
Figure 2 is a partial sectional view of the column of Figure 1 with the section being taken along the line 2—2 of Figure 1.

Referring next to Figures 1 and 2 of the drawing a gas separation column is indicated generally at 20. Such column includes a vertical wall means 21 and a plurality of horizontal trays some of which are illustrated at 22, 23, and 24.

Each of the trays carries a plurality of bubble caps indicated generally at 28, 29, and 30. A plurality of vertical baffle plates 33, 34, 35, and 36 are disposed transversely to the bubble caps and form a plurality of separated basins such as the ones indicated at 37 and 38.

Each of the basins forms a pool for liquid separated from the other pools on the tray and is provided with a vertical downcomer such as 40 in Figure 1. Each downcomer extends for a predetermined height above the upper surface of its respective tray and is formed as a hollow drain conduit for establishing the liquid level in its respective basin. The downcomers extend through the trays and have lower ends terminating just above the next lower tray as illustrated in Figure 2.

Referring next to Figure 3, each bubble cap is shown formed as an inverted U-shaped member forming a gas trap or riser area 45 into which the rising gas is admitted through an opening 47. Each bubble cap is provided with a vertical riser baffle 50 or dividers which combines with the baffle 34 and walls of the bubble cap to form a pool 51 of liquid within the confines of bubble cap 29.

A slot 53 connects the internal pool 51 with the external pool 37 with gas pressure above the liquid in pool 51 maintaining the surface 55 thereof below the surface 56 of the external pool of liquid.

As seen in Figure 3, gas continuously ascends into the riser area 45, passes over the top of baffle 50, and bubbles through the liquid in pools 51 and 37 to escape at the surface 56.

In operation, when the column 20 is tilted about an axis of roll, which axis is represented at 60 in Figure 1, the surface 56 of the external pool 37, Figure 3, will be disposed at an angle, relative to the tray, as is indicated by surface datum 62. Similarly, surface 55 of internal pool 51 will be disposed at an angle, relative to the tray, as shown at surface datum 64. Assuming any practical roll angles such as are represented by the angles between the surface datums 62 or 63 and the tray 22, the height $h-1$ of the downcomer, the height $h-2$ of the bubble cap walls, and the height $h-3$ of the slot 53 are established, for any given bubble cap spacing SR, so as to maintain surface datums 62 and 63 always below the tops 66 of the bubble caps and above the tops 67 of slots 53. As a result, liquid will always be maintained above the top of slot 53 whereby gas must bubble through liquid in escaping from the interior of the bubble cap. Moreover, since the datums 62 and 63 are always below the tops 66 of the bubble caps, which caps form walls for the pool, liquid will never spill over from one pool to another.

With continued reference to Figure 3, and again considering the column 20 as being tilted about the axis of roll, the height $h-4$ of riser baffle 50 is established relative to the height $h-3$ of slot 53 such that datum 64 will always be below the top 70 of the riser baffle 50 for all angles of roll up to and including the maximum to be encountered.

Referring next to Figure 2, and assuming the column is tilted about an axis of pitch, which axis is represented at 72 in Figure 1, it is also necessary to maintain the liquid surface 56, for each external pool 37 (Figure 3), always below the tops of the bubble caps 30 and baffles 34, and above the tops 67 of the slots 53. This condition must be maintained for all angles of pitch up to and including the maximum to be encountered in order to continuously provide liquid at the slots 53 through which the ascending gas can bubble. Accordingly, the surface datum 74, for each of the external pools, must always be above the tops 67 of its respective slots 53 and below the tops of the bubble caps 30 and baffles 34 and 35. This condition is illustrated at surface datum 74 in Figure 2 and is obtained by establishing the distance $S_p$ between adjacent baffles, such as 34 and 35, relative to the height $h-1$ of downcomer 40 such that surface datum 74 for the external pools is always below the top of the bubble caps forming walls for the pools. Hence liquid will never spill from one pool to the other up to and including the maximum angle of pitch to which the column is ever subjected during operation.

With further reference to Figure 2, and again assuming the column is tilted about an axis of pitch, it is also necessary to maintain the liquid surface 55, of the internal pool 51, Figure 3, always below the top 70 of the riser 50. This condition must be maintained for all angles of pitch up to and including the maximum to be encountered in order to continuously provide liquid at the slots 53 through which the ascending gas can bubble. Accordingly, the surface datum 75, for each of the internal pools 51, must always be below the top 70 of its respective riser baffle 50. This condition is illustrated at surface datum 75 in Figure 2.

In summary, it is seen that the gas separating column of the present invention is adapted for continuously efficient operation when subjected to tilting from both pitch and roll of a supporting platform. The liquid is maintained in a plurality of separate pools whereby liquid and gas flows and liquid heights are maintained relatively constant for any tray of the column during continual pitch and roll conditions.

While the forms of embodiments of the present invention as herein disclosed constitute preferred forms, it is to be understood that other forms might be adopted, all coming within the scope of the claims which follow:

We claim:

1. In a gas separation-apparatus, the combination of tray means forming a horizontal surface, a plurality of spaced bubble caps on said surface, each of said bubble caps including a gas intake opening through said tray means and a gas outlet opening adjacent the upper surface of said tray means; a plurality of spaced baffles on said surface and extended transversely to said bubble caps to form a plurality of wells for retaining pools of liquid separated one from another, the walls of each of said wells being formed by said baffles and bubble caps, a plurality of wells being provided between each pair of baffles; a liquid drain member centrally disposed in each of said wells intermediate said walls of the well formed by said baffles and bubble caps and extended through said tray means and having an upper opening above said horizontal surface and below the tops of the side walls of said wells; divider means in each of said bubble caps between said gas intake opening and said gas outlet opening each divider being higher than the associated gas outlet opening; and the vertical distance of said drain opening above said surface being less than the height of the baffles and bubble caps and greater than the height of the associated gas outlet opening.

2. A novel gas separating apparatus for operation at various inclinations of its supporting platform from the horizontal comprising, in combination, a housing, a plurality of horizontally extending trays arranged in said housing and spaced vertically one from the other, a plurality of vertically extending baffles on each tray dividing the floor defined by such tray into a plurality of compartments, a plurality of spaced bubble caps in each compartment and on the upper surface of the associated tray, each of said bubble caps being of inverted U-shaped section and formed with a top wall and side walls extending transverse to the baffles, individual gas intake openings formed through each tray between the bubble caps and the space below the tray, each bubble cap having one continuous side wall and one side wall formed with a gas outlet opening on its lower portion, a riser baffle in each bubble cap disposed parallel to its side walls, a plurality of liquid wells being provided on said upper surface of each tray, the majority of said wells being individually formed and bounded by two baffles and a continuous bubble cap side wall and a riser baffle, each of said wells being in direct communication with only one of said gas outlet openings; a drain member for each of said wells located between baffles and offset from the bubble caps and having a drain intake opening positioned above the upper surface of the associated tray and a drain outlet opening communicating with the space below the tray, the height of said drain intake opening above said surface being less than that of the bubble cap top walls or that of the baffles and greater than that of the gas outlet openings to establish a liquid level in each well, which liquid level remains above the height of the associated gas outlet opening and below the top walls of the bubble caps when the tray is inclined at a predetermined angle from the horizontal on an axis perpendicular to the baffles, the liquid level in each well remaining below the height of the baffles when the tray is inclined at a predetermined angle from the horizontal on an axis parallel to the baffles, the riser baffle in each bubble cap being positioned between gas intake and gas outlet openings for preventing liquid from entering the associated gas intake opening, each riser baffle being higher than the associated gas outlet opening.

References Cited in the file of this patent

UNITED STATES PATENTS

| 903,483 | Koppers | Nov. 10, 1908 |
| 2,366,958 | Dennis | Jan. 9, 1945 |
| 2,714,504 | Bowles | Aug. 2, 1955 |
| 2,720,389 | Twomey et al. | Oct. 11, 1955 |
| 2,804,292 | Schilling | Aug. 27, 1957 |

FOREIGN PATENTS

| 765,304 | Great Britain | Jan. 9, 1957 |